United States Patent [19]

Imanari

[11] Patent Number: 4,958,941
[45] Date of Patent: Sep. 25, 1990

[54] SUPPORT UNIT

[75] Inventor: Yoshifumi Imanari, Shibukawa, Japan

[73] Assignee: Nippon Seiko Kabushiki Kaisha, Tokyo, Japan

[21] Appl. No.: 484,111

[22] Filed: Feb. 23, 1990

[30] Foreign Application Priority Data

Mar. 6, 1989 [JP] Japan ................................ 1-25318[U]

[51] Int. Cl.$^5$ ............................................. F16C 33/58
[52] U.S. Cl. ..................................... 384/474; 384/510; 384/515; 384/540; 384/551; 384/617
[58] Field of Search ............... 384/474, 540, 515, 510, 384/617, 551, 585

[56] References Cited

U.S. PATENT DOCUMENTS

| | | | |
|---|---|---|---|
| 1,273,187 | 7/1918 | Rydberg | 384/515 |
| 2,033,771 | 3/1936 | Leister et al. | 384/515 |
| 4,040,685 | 8/1977 | Berglund | 384/540 |
| 4,732,497 | 3/1988 | Sawa et al. | 384/540 |

Primary Examiner—Lenard A. Footland
Attorney, Agent, or Firm—Basile and Hanlon

[57] ABSTRACT

A support unit serving as a support bearing includes an angular ball bearing. An inner race of the bearing is held by a step portion of a shaft to receive a load in a direction of thrust. An outer race of the bearing has a flange protruding from the outer peripheral surface radially at one end portion of the outer race. The outer race is fixed by a housing by making one end face of the housing abut against the flange. The inner race of the bearing is fixed by clamping a nut which engages a threaded portion of the shaft.

4 Claims, 2 Drawing Sheets

SUPPORT UNIT

BACKGROUND OF THE INVENTION

1. Field of the Invention

The present invention relates to a support unit suitable as a support bearing of a precision ball screw used in a feed gear for a numerical control machine tool, precision measuring equipment, and the like.

2. Description of the Prior Art

Prior art support units of this type are structured, for example, as shown in FIGS. 3 and 4. In the support unit shown in FIG. 3, a single angular ball bearing A is assembled in a housing 1 to receive a thrust load in one direction. A shoulder 2 is formed in an inner peripheral surface of the housing 1. A step portion 3A is provided on a shaft 3 serving as a supported shaft so that one end of an outer race 5 of the angular ball bearing A fitted in the housing 1 is held by the shoulder 2 and one end face of an inner race 6 is in abutment with the step portion 3A thereby to receive the thrust load.

In the support unit shown in FIG. 4, two angular ball bearings A1 and A2 are assembled to receive thrust load in two directions. A shoulder 2 is formed in an inner peripheral surface of a housing 1A having the two angular ball bearings A1 and A2 fitted therein to hold an outer race 52 of one bearing A2. A bearing pressing cover 8 is fixed to an open end of the housing 1A to hold an end of an outer race 51 of the other bearing 1A at an end face 9 of the cover 8 thereby to receive the thrust load.

Although the support units mentioned above are of an open type and no seal structure is involved, a seal structure is employed in some cases in order to seal lubricant therein and to achieve a dust proof condition. In this case, in the support unit shown in FIG. 3, a sealing cover 10 is provided, as shown by a chain line, and furthermore, a seal structure is employed in the housing 1. Alternatively, seal members or oil seals 11 are attached to the cover 10 and the housing 1. In the support unit shown in FIG. 4, a seal structure is employed in the bearing pressing cover 8 and in the housing 1A. Alternatively, the seal member or the oil seal 11 is employed. Reference numeral 12 designates a lock nut.

However, in the prior art mentioned above, since the bearing is held at the inner surface of the housing 1, the structure is complicated. In particular, when the support unit is used with high precision and high rigidity by applying a preload to the bearing A, there exists a problem in that high machining accuracy is needed in forming the shoulder 2 in the inner peripheral surface of the housing 1 or 1A. Accordingly, high productivity is difficult to achieve.

Furthermore, when the bearing pressing cover 8 or the sealing cover 10 is provided at the opening end of the housing 1 or 1A, a problem is involved in that the number of parts and costs are increased.

Moreover, when the seal structure is employed, a problem is posed in that the structure of the housing 1 or 1A becomes complicated since the sealing member and a seal are attached to the housing 1 or 1A, and the attaching of the sealing member is troublesome.

SUMMARY OF THE INVENTION

The present invention was made in view of the above mentioned problems in the prior art, and it is an object of the invention to provide a support unit which has a simple structure and is easy to manufacture.

A support unit of the present invention includes an angular ball bearing assembled in a housing. An inner race of the bearing is held by a step portion of a supported shaft to receive load in a direction of thrust. A flange is formed in an outer peripheral surface of an outer race of the bearing so that the outer race is fixed by making an end face of the housing abut against the flange. The inner race is fixed by clamping a nut which engages the supported shaft.

A seal member may be provided in at least one end of the angular ball bearing.

The support unit may include a plurality of angular ball bearings disposed in series. A distance piece may be interposed between the bearings.

The housing may be formed with an oil hole or passage in a peripheral side so that the oil hole is in communication with a space formed by the distance piece between the bearings.

In the present invention, since a flange is formed on an outer peripheral surface of an outer race of a bearing so that one end face of the housing is in abutment with the flange, there is no need to hold the bearing on an inner surface of the housing and the structure of the housing becomes simple. In particular, even when the support unit is used with high precision and high rigidity by applying preload to the bearing, there is no need to perform sophisticated machining on the inner surface of the housing, and high productivity can be achieved.

Furthermore, even when a plurality of bearings are disposed in series, there is no need to provide a bearing pressing cover on the housing. Thus, the structure of the housing is simple and the number of parts is decreased resulting in a reduction of costs.

When a seal structure is desired, a seal member may be attached within the bearing, and thus the structure of the housing is simple.

DETAILED DESCRIPTION OF THE PREFERRED EMBODIMENT

Figure 1:
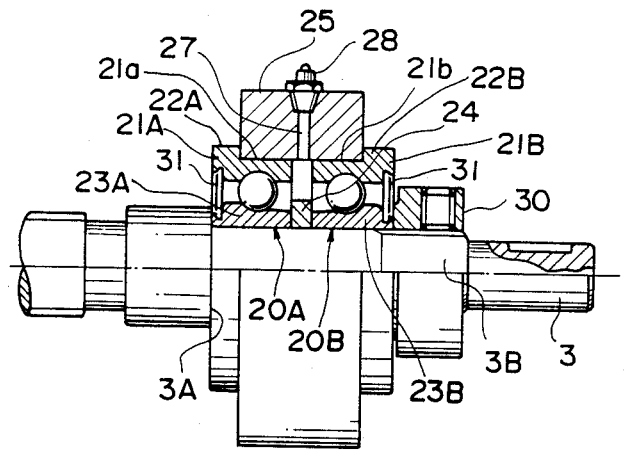
FIG. 1 is a side view partially in cross section showing an embodiment of a support unit of the present invention.
Figure 2:
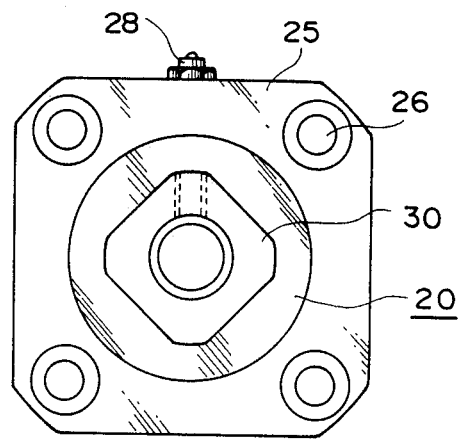
FIG. 2 is a front view of the support unit of FIG. 1.
Figure 3:
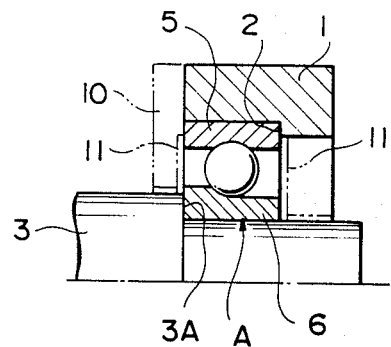
FIGS. 3 and 4 are respectively longitudinal sectional views of prior art support units.
Figure 4:
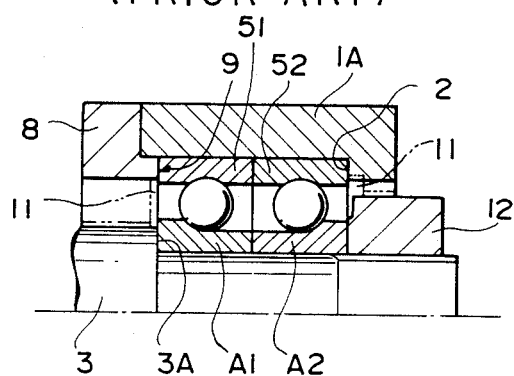

With reference to FIGS. 1 and 2, two angular ball bearings (hereinafter, each referred to as a bearing) 20A and 20B are fitted about a screw shaft 3 of a ball screw. Flanges 22A and 22B are respectively formed on outer peripheral surfaces of outer races 21A and 21B so that the outer peripheral surface portions near the axial outer ends protrude radially therefrom. One bearing 20A is fitted about the shaft 3 with its flange 22A at the front or left-hand side in FIG. 1. One end face of an inner race 23A at the flange side is held by a step portion 3A of the shaft 3. Then a distance piece 24 is installed by inserting the screw shaft 3 into the distance piece 24. This distance piece 24 is used to preload the bearing 20A to provide rigidity when positioning with high precision is required. Thus, the distance piece 24 may not always be used. After the distance piece 24 is mounted, the other bearing 20B is fitted about the shaft 3 so that the flange 22B is at the rear or right-hand side opposite to the flange 22A of the one bearing 20A. Trunk portions 21a and 21b of the two bearings 20A and 20B form an annular recess between the flanges 22A and 22B. A housing 25 is fitted about this recess or the trunk portions 21a and 21b.

The housing 25 has a simple shape in which a fitting hole is formed in the center of a square plate. The housing 25 is attached to a piece of mechanical equipment by using fixing bolt holes 26 formed in four corners of the square plate. Furthermore, an oil hole or passage 27 is formed in one peripheral side, and an oil fitting 28 is attached thereto. The oil hole 27 is in communication with a space formed by the distance piece 24 between the bearings 20A and 20B.

The fixing of the two bearings 20A and 20B mounted on the screw shaft 3 is effected by clamping a lock nut 30 which engages a fixing male thread 3B of the screw shaft 3. The inner races 23A and 23B are fixed between the lock nut 30 and the step portion 3A. On the other hand, the outer races 21A and 21B are fixed since the flanges 22A and 22B sandwich and hold the housing 25 firmly therebetween. Each of the bearings 20A and 20B is provided therein with an ordinary seal member 31 as a seal part for sealing grease and for preventing the entry of dust.

Since the support unit is configured as described above, the structure of the housing 25 is very simple as compared with that in the prior art, and there is no need to perform sophisticated machining on the inner surface of the housing 25 to hold the bearings.

The plurality of bearings 20A and 20B can be disposed in series without providing a bearing pressing cover on the housing 25, and thus the number of parts can be reduced.

In employing a seal structure, since the seal member 31 is attached to each of the bearings 20A and 20B, the structure of the housing 25 is not affected.

In the above embodiment, although two bearings 20A and 20B are provided, it goes without saying that the present invention is applicable to the case where a single bearing is provided.

In a support unit of the present invention, as described in the foregoing, an outer race of a bearing is formed with a flange protruding radially from an outer peripheral surface of the outer race so that the outer race is fixed by making one end face of a housing abut against the flange. An inner race is fixed by clamping a nut which engages a supported shaft. As a result, there is no need to hold the bearing at an inner surface of the housing, and the structure becomes simple. In particular, even when the support unit is used with high precision and high rigidity by preloading the bearing, it is not necessary to perform sophisticated machining on the inner surface of the housing, and high productivity can be achieved.

Furthermore, a plurality of bearings can be arranged in series without providing a bearing pressing cover in the housing, and thus the number of parts is decreased and the costs can be reduced.

Furthermore, in employing a seal structure, since a seal member is attached within the bearing, there is no need to attach a cover and a seal member for sealing to the housing as in the prior art. As a result, the structure is simple and handling is easy, and a large required use space can be saved.

What is claimed is:

1. A support unit comprising:
   a housing having an aperture formed therein for receiving a fixing bolt;
   an angular ball bearing having an outer race and an inner race assembled in said housing, the inner race of said bearing being held by a step portion of a supported shaft to receive a load in a direction of thrust;
   a flange formed on an outer peripheral surface of the outer race of said bearing, said flange being adapted to abut against one end face of said housing to fix the outer race in position; and
   a nut engaging said supported shaft for clamping the inner race of said bearing to fix the inner race in position.

2. The support unit according to claim 1, further comprising a seal member provided on at least one axial end of said angular ball bearing.

3. The support unit according to claim 1, further comprising another angular ball bearing to form a plurality of angular ball bearings arranged in series, and a distance piece interposed between said plurality of angular ball bearings.

4. The support unit according to claim 3, further comprising an oil passage formed in one side surface of said housing, said oil passage being in communication with a space formed by said distance piece between said plurality of angular ball bearings.

* * * * *